United States Patent
Imamura et al.

(10) Patent No.: US 8,111,639 B2
(45) Date of Patent: Feb. 7, 2012

(54) RADIO TRANSMITTING APPARATUS AND RADIO TRANSMITTING METHOD

(75) Inventors: Daichi Imamura, Kanagawa (JP); Atsushi Matsumoto, Ishikawa (JP); Takashi Iwai, Ishikawa (JP); Sadaki Futagi, Ishikawa (JP); Tomofumi Takata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 797 days.

(21) Appl. No.: 12/159,373

(22) PCT Filed: Dec. 26, 2006

(86) PCT No.: PCT/JP2006/325967
§ 371 (c)(1),
(2), (4) Date: Jun. 26, 2008

(87) PCT Pub. No.: WO2007/074841
PCT Pub. Date: Jul. 5, 2007

(65) Prior Publication Data
US 2010/0220666 A1   Sep. 2, 2010

(30) Foreign Application Priority Data
Dec. 28, 2005   (JP) .................................. 2005-379405

(51) Int. Cl.
*H04B 7/005* (2006.01)
(52) U.S. Cl. .......................... 370/278; 370/329; 370/347
(58) Field of Classification Search .................. 370/328, 370/329, 278, 341, 336, 337, 347, 442, 441, 370/335, 342, 444
See application file for complete search history.

(56) References Cited

U.S. PATENT DOCUMENTS

| | | | |
|---|---|---|---|
| 6,259,724 B1 | 7/2001 | Esmailzadeh | |
| 7,120,132 B2* | 10/2006 | Choi et al. | 370/324 |
| 7,324,465 B2* | 1/2008 | Lim et al. | 370/278 |
| 2002/0191633 A1 | 12/2002 | Ishikawa | |
| 2005/0232158 A1* | 10/2005 | Hondo | 370/241 |

FOREIGN PATENT DOCUMENTS

| | | |
|---|---|---|
| JP | 2001-502866 | 2/2001 |
| JP | 2001/292166 | 10/2001 |
| JP | 2001-352273 | 12/2001 |
| JP | 2002/111639 | 4/2002 |

OTHER PUBLICATIONS

International Search Report dated Mar. 20, 2007.
3GPP TSG RAN WG1 Meeting #43, Ericsson, "E-UTRA Random Access," R1-051445, Seoul, Korea, Nov. 7-11, 2005, 4 pages total.
Notice of the Reasons for Rejection dated Aug. 9, 2011.

* cited by examiner

*Primary Examiner* — Huy Vu
*Assistant Examiner* — Dady Chery
(74) *Attorney, Agent, or Firm* — Dickinson Wright PLLC

(57) ABSTRACT

A radio transmitting apparatus and a radio transmitting method wherein the increase of the guard time in a random access region is reduced to secure the data transmitting region of an upstream line. In this apparatus, when a received signal power estimated by a received signal power estimating part (205) is the higher, a RACH format selecting part (206) selects a RACH format having the longer frame length. Contrarily, when a received signal power estimated by the received signal power estimating part (205) is the lower, the RACH format selecting part (206) selects a RACH format having the shorter frame length. A RACH data part arranging part (207) appropriately selects, in accordance with the selected RACH format, top-priority information, such as terminal identifiers, priority information, such as connection request information or band assignment request information, and non-priority information and arranges RACH data parts.

8 Claims, 19 Drawing Sheets

| ADDITIONAL INFORMATION INDICATOR[3bit] | ADDITIONAL INFORMATION TYPE |
|---|---|
| 000 | NO ADDITIONAL INFORMATION (THE THIRD RACH FORMAT CONFIGURATION) |
| 001 | ACCESS REQUEST INFORMATION |
| 010 | RESOURCE ALLOCATION REQUEST INFORMATION |
| 011 | ACCESS REQUEST INFORMATION AND OTHER INFORMATION |
| 100 | RESOURCE ALLOCATION REQUEST INFORMATION AND OTHER INFORMATION |
| 101 | USER DATA (SAME FRAME LENGTH AS FIRST RACH FORMAT) |

FIG.12

RADIO TRANSMITTING APPARATUS AND RADIO TRANSMITTING METHOD

TECHNICAL FIELD

The present invention relates to a radio transmitting apparatus and a radio transmission method.

BACKGROUND ART

Random access areas are provided in mobile communication systems represented by cellular communication systems and wireless LAN (Local Area Network) systems. A random access area refers to an uplink transmission area that is provided as when a communication terminal requests an initial access to a base station (or an access point) or when a new resource allocation request is issued in a centralized management system where a base station allocates transmission time and transmission band to communication terminals.

The transmission timing for a random access channel (RACH) transmitting in a random access area is normally determined based on the synchronization timing in downlink. That is, a communication terminal establishes downlink frame timing synchronization using, for example, a frame synchronization pilot signal transmitted from a base station in downlink, and transmits RACH to a designated random access area.

Accordingly, when the distance between the base station and the communication terminal is longer, the time a RACH transmitted from the communication terminal takes to arrive at the base station increases. That is to say, if the time a downlink frame synchronization signal arrives at a communication terminal is delayed due to propagation delay, the frame timing at the communication terminal is also delayed by the length of the propagation delay. Moreover, this communication terminal starts transmitting the RACH based on its own frame timing, and, consequently, the arrival of the RACH is further delayed by the length of propagation delay. As a result, the arrival time for the RACH is delayed twice as much as a case without propagation delays.

Non-patent document 1 discloses a technique of assigning a guard time equal to or greater than the maximum propagation delay anticipated in the system between a RACH frame (the frame where RACH is allocated) and a frame of the subsequent another channel, to reduce or prevent inter frame interference occurred by overlapping the tail of RACH of large propagation delay and the beginning of the subsequent channel.

For example, as shown in FIG. 1, the RACH frame is formed with a preamble part (a pilot signal) and a data part (terminal ID information, access request information/resource allocation request information and others). In an random access area, as shown in FIGS. 2A and 2B, RACH frame length and guard time are provided such that the tail of the RACH from the communication terminal (UE3 in the figure) located at the farthest position from the base station stays within the random access area. This is to prevent the tail of the RACH frame from entering the next area and producing interference between the RACH frame and the frame transmitted in the next transmission area.

Non-patent Document 1: Ericsson, "E-UTRA Random Access", R1-051445, 3GPP TSG RAN WG1 Meeting #43, Seoul, Korea, Nov. 7-11, 2005.

DISCLOSURE OF INVENTION

Problems to be Solved by the Invention

However, the technique described in the Non-patent document 1 described above needs to set the guard time greater when a cell radius supported by one base station (or an access point) is longer, and, consequently, there is a problem that uplink data transmission area decreases.

It is therefore an object of the present invention to provide a radio transmitting apparatus and radio transmission method that reduce guard time increase in the random access area and keep uplink data transmission area.

Means for Solving the Problem

The radio transmitting apparatus of the present invention adopts a configuration including: a propagation distance estimating section that estimates a propagation distance from a communicating party station based on a signal transmitted from the communicating party station; a selecting section that selects a random access channel format of a frame length supporting the estimated propagation distance, from a plurality of random access channel formats of frame lengths supporting propagation distances; and a transmitting section that transmits a random access channel using the selected random access channel format.

The radio transmission method of the present invention includes a propagation distance estimating step of estimating a propagation distance from a communicating party station based on a signal transmitted from the communicating party station; and a selecting step of selecting a random access channel format of a frame length supporting the estimated propagation distance, from a plurality of random access channel formats of frame lengths supporting the propagation distances.

Advantageous Effect of the Invention

According to the present invention, guard time increase in random access areas can be reduced and uplink data transmission areas can be kept.

BRIEF DESCRIPTION OF DRAWINGS

FIG. 12 illustrates the corresponding relationships between the information types arranged next to the highest priority information and indicators showing the types (additional information indicators);

BEST MODE FOR CARRYING OUT THE INVENTION

Figure 1:
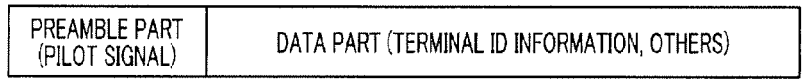
FIG. 1 is the RACH frame configuration disclosed in Non-patent document 1.
Figure 2A:
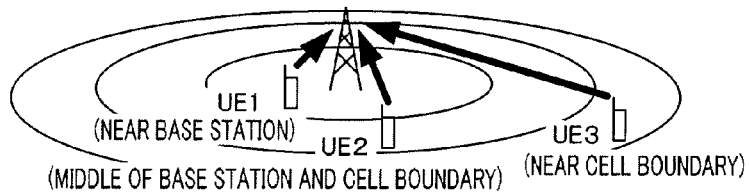
FIG. 2A explains a setup method of the random access area disclosed in Non-patent document 1.
Figure 2B:
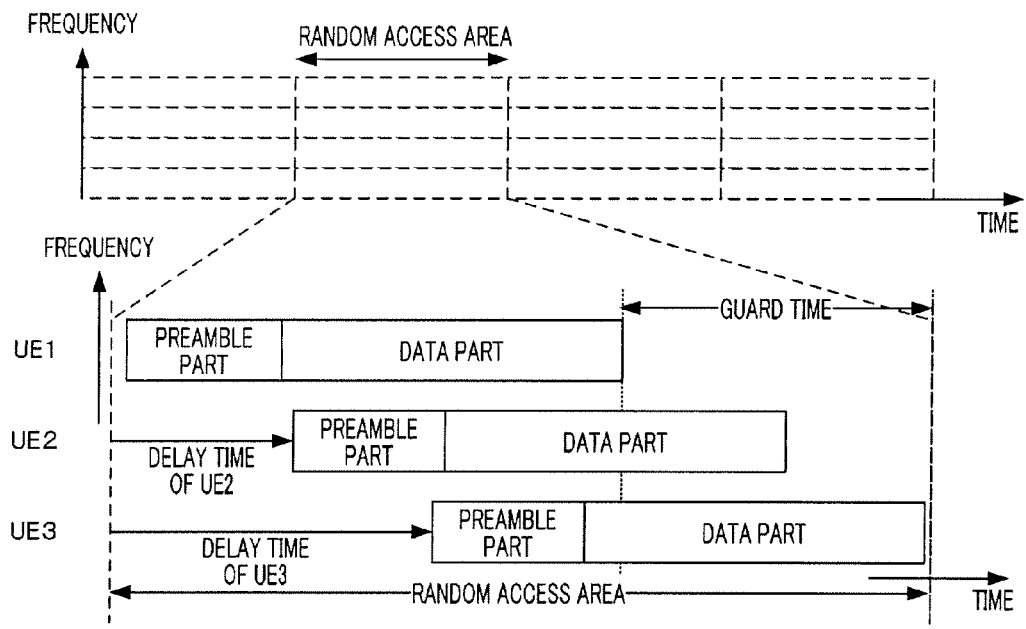
FIG. 2B explains a setup method of the random access area disclosed in Non-patent document 1.

Now, embodiments of the present invention will be described in detail with reference to the accompanying drawings. Further, in embodiments, the components having the same functions will be assigned the same reference numerals and overlapping descriptions will be omitted.

Embodiment 1

With Embodiment 1 of the present invention, three RACH formats of different lengths are prepared in advance. That is, the first RACH format of the longest frame length, a second RACH format of the second longest frame length, and a third RACH format of the shortest frame length are prepared.

On the other hand, the information transmitted in the RACH frames is classified into three levels of priority (i.e. significance), and the information that has to be transmitted in all RACH frames is the highest priority information of the highest priority. Moreover, the information that is produced when a RACH frame is generated, that is efficient to be transmitted in RACH frames (but can be transmitted in frames other than RACH frames), is priority information of the second highest priority. Moreover, the information, which can be transmitted in scheduled channels but is efficient to be transmitted in RACH is non-priority information of the lowest priority.

Here, specific examples of the highest priority information include the preamble part (pilot), which is a signal for RACH frame synchronization, channel estimation and RACH frame decision in a base station, and the terminal identifier (UE-ID), which is information for identifying a communication terminal transmitted RACH. Terminal identification may be performed by forming the preamble part such that the signal pattern forming the preamble part shows the type of the communication terminals.

Moreover, specific examples of priority include the access request information transmitted when a communication terminal first connects to a base station, and the resource allocation request information requesting data transmission bandwidth allocation in uplink for a base station when data to be transmitted to a base station in uplink is produced.

Furthermore, specific examples of non priority information include the information showing communication terminal conditions such as a buffer status, transmission power information, and downlink channel quality information, the control information generated by a MAC (Medium Access Control) section, an RLC (Radio Link Control) section and an RRC (Radio Resource Control) section, and the user data of a small size that can be transmitted in RACH.

Figure 3A:
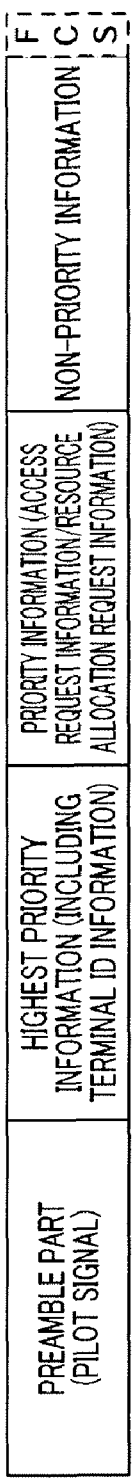
FIG. 3A illustrates the RACH format according to Embodiment 1 of the present invention.
Figure 3:
FIG. 3B illustrates the RACH format according to Embodiment 1 of the present invention.
FIG. 3C illustrates the RACH format according to Embodiment 1 of the present invention.
Figure 3C:
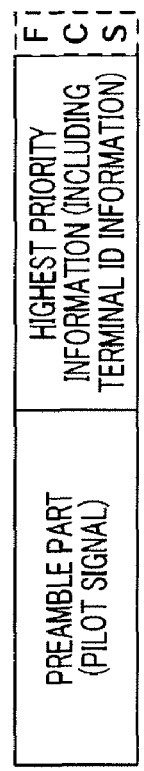

FIGS. 3A to 3C show three RACH formats includes information classified into these three levels of priority. The first to third RACH formats shown in FIGS. 3A to 3C each include a preamble part, highest priority information including a terminal identifier, and a FCS (Frame Check Sequence) for error detection. The first RACH format shown in FIG. 3A further includes information including access request information and resource allocation request information, and non-priority information. Moreover, the second RACH format shown in FIG. 3B includes priority information. Although the third RACH format shown in FIG. 3C does not include access request information or resource allocation request information, if the receiving timing is estimated using the preamble part and the terminal identifier is specified, access request information and resource allocation request information can be allocated to the scheduled channels and transmitted.

Here, a "scheduled channel" refers to a channel where a centralized control station (generally a base station) specifies transmission timings and frequency bandwidth for signal transmission and reception with communication terminals, so that the communication terminals carry out transmission and reception following these specifications, and where contention therefore does not occur.

Figure 4:
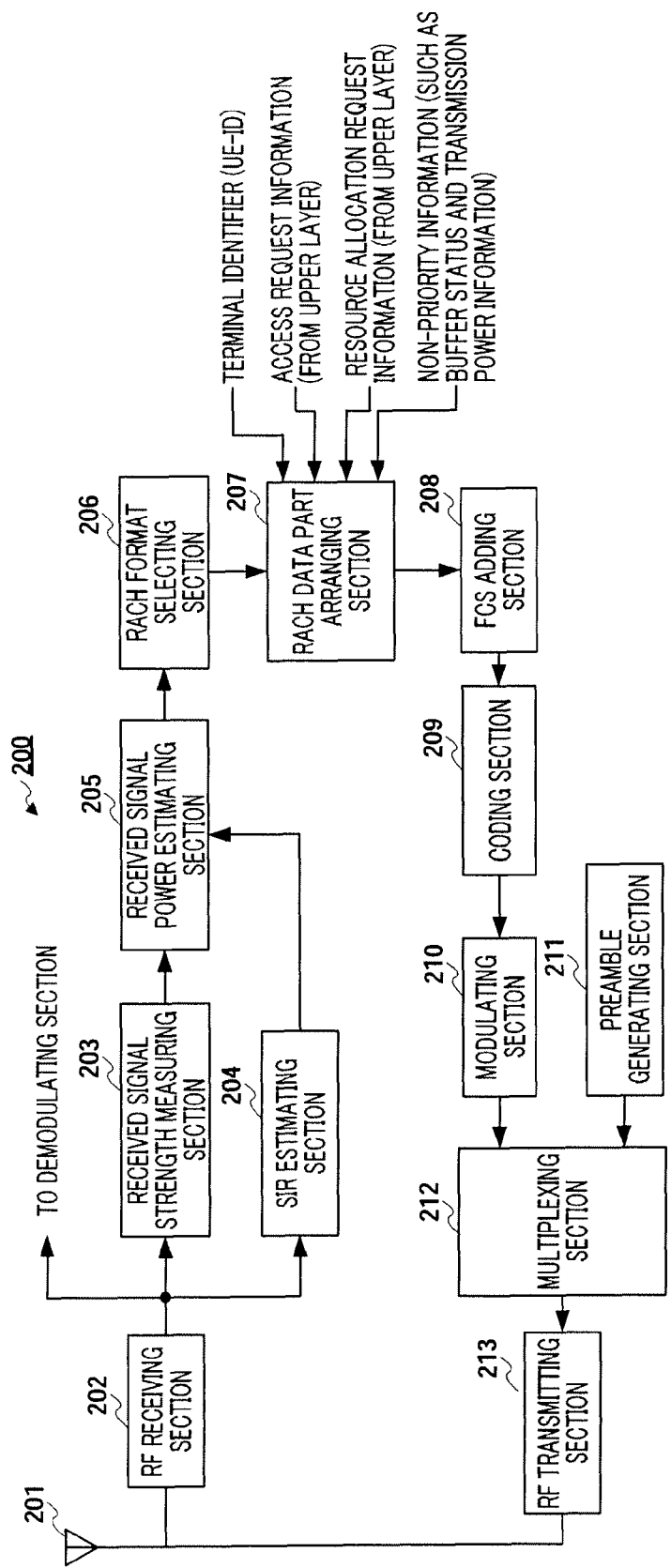
FIG. 4 is a block diagram showing the configuration of the communication terminal according to Embodiment 1 of the present invention.

FIG. 4 is a block diagram showing the configuration of communication terminal 200 according to Embodiment 1 of the present invention. Referring to this figure, RF receiving section 202 receives a downlink signal transmitted from the base station via antenna 201, performs predetermined radio receiving processing such as down-conversion and A/D conversion on the received downlink signal, and outputs the signal subjected to radio receiving processing to the demodulating section (not shown), received signal strength measuring section 203 and SIR estimating section 204.

Received signal strength measuring section 203 measures the power of signals outputted from RF receiving section 202, that is, all signals received through antenna 201, that is, measures received signal strength and outputs the measured result to received signal power estimating section 205.

SIR estimating section 204 estimates an SIR (Signal to Interference Ratio) using the pilot signal or the data signal, out of the signals outputted from RF receiving section 202 and outputs the estimated SIR value to received signal power estimating section 205. The SIR estimation value is acquired from the same processing as CQI (Channel Quality Indicator) estimation.

Received signal power estimating section 205, which is a propagation distance estimation means, calculates received signal power, from which interference power is cancelled, using the received signal strength outputted from received signal strength measuring section 203 and the SIR value outputted from SIR estimating section 204, and outputs the calculated received signal power to RACH format selecting section 206.

Figure 5:
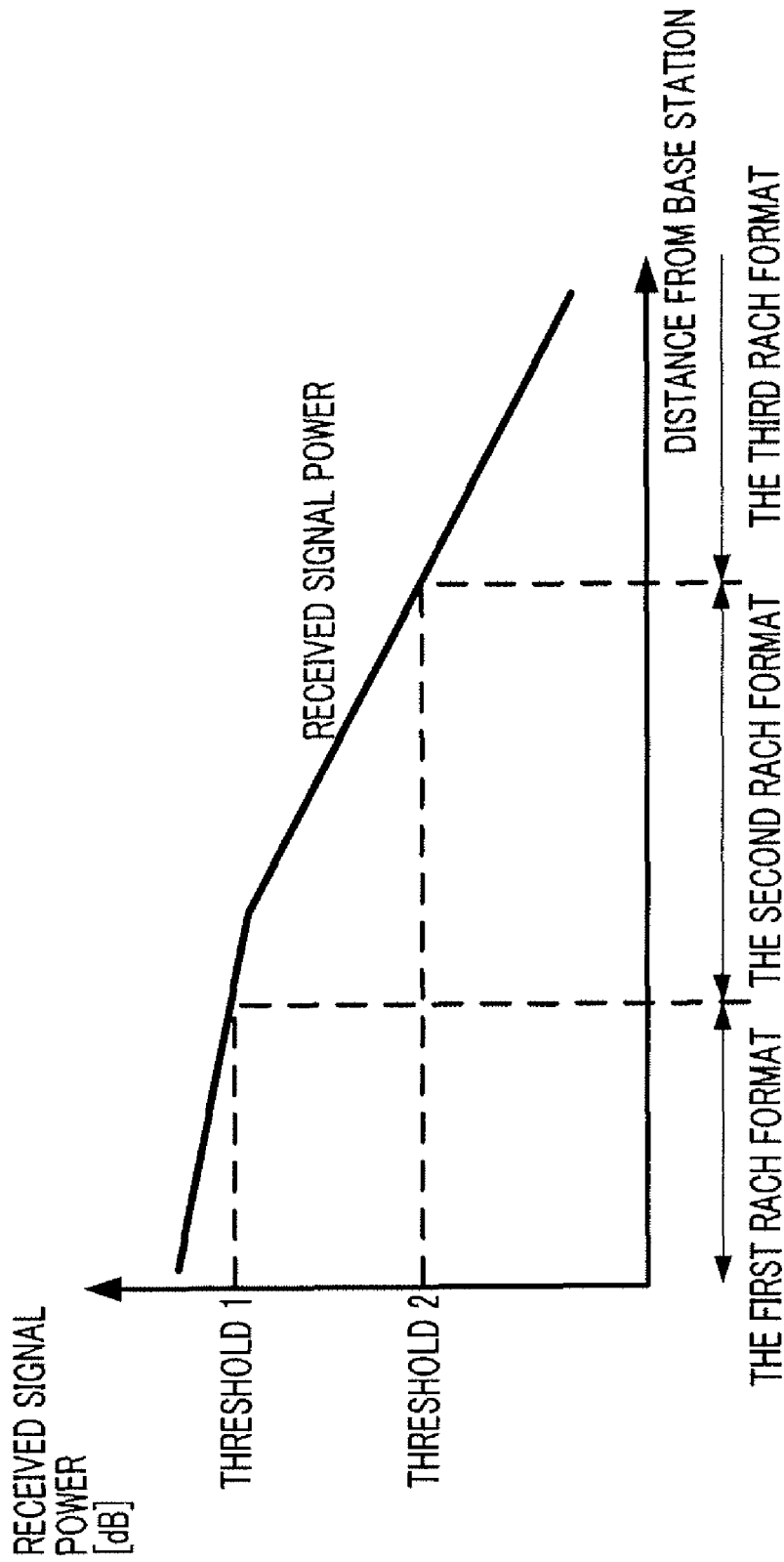
FIG. 5 explains a selecting method of the RACH format.

RACH format selecting section 206 selects one of the first to the third RACH formats shown in FIG. 3 according to the received signal power outputted from received signal power estimating section 205. To be more specific, RACH format selecting section 206 provides a threshold 1 and a threshold 2 (which is smaller than this threshold 1), and performs threshold decision on the received signal power for the thresholds. FIG. 5 shows how this is. As shown in FIG. 5, RACH format selecting section 206 selects the first RACH format if the magnitude of received signal power is equal to or more than threshold 1. RACH format selecting section 206 selects the second RACH format if the magnitude of received signal power is less than threshold 1 and equal to or more than threshold 2. RACH format selecting section 206 selects the third RACH format if the magnitude of received signal power is less than threshold 2.

In this way, RACH format selecting section 206 assumes that the magnitude of received signal power matches the distance from the base station to a communication terminal and selects the RACH format of a length supporting the distance from the base station to the communication terminal. That is, RACH format selecting section 206 assumes that the distance from the base station to a communication terminal is shorter when the magnitude of received signal power is greater, given the little propagation delay, selects a RACH format of a long frame length (here, the first RACH format). On the other hand, RACH format selecting section 206 assumes that the distance from the base station to a communication terminal is longer when the size of received signal power is smaller, and, given the significant propagation delay, and selects a RACH format of a short frame length (here, the third RACH format). The selected RACH formats are reported to RACH data part arranging section 207.

Based on the RACH format reported from RACH format selecting section 206, RACH data part arranging section 207 adequately selects the terminal identifier, access request information, resource allocation request information, non-priority information (e.g. buffer status and transmission power information) and arranges the data part in the RACH. That is, when the first RACH format is reported from RACH format selecting section 206, information bits are arranged in the order of the terminal identifier, access request information or resource allocation request information, and non-priority information. Moreover, when the second RACH format is reported, the bits are arranged in the order of the terminal identifier and access request information or resource allocation request information. Furthermore, when the third RACH format is reported, the terminal identifier alone is arranged. The data part in the RACH arranged as such is outputted to FCS adding section 208.

FCS adding section 208 adds the bits for error detection (FCS: Frame Check Sequence) to the data part in the RACH outputted from RACH data part arranging section 207 and outputs the RACH data with a FCS to coding section 209.

Coding section 209 performs error correction coding processing over the whole of the RACH data including the FCS outputted from FCS adding section 208, and modulating section 210 performs modulating processing over the transmission data sequence subjected to error correction coding processing and converts the transmission data sequence to a transmission symbol sequence. The transmission symbol sequence is outputted to multiplexing section 212.

Preamble generating section 211 generates a RACH frame preamble (pilot) and outputs the generated preamble to multiplexing section 212.

Multiplexing section 212 multiplexes the transmission symbol sequence outputted from modulating section 210 and the RACH frame preamble part outputted from preamble generating section 211, and generates a RACH frame. The generated RACH frame is outputted to RF transmitting section 213.

RF transmitting section 213 performs predetermined radio transmission processing including D/A conversion and up-conversion, on the signal outputted from multiplexing section 212 and transmits the signal subjected to radio transmission processing from antenna 201 onto the transmission path.

Figure 6A:
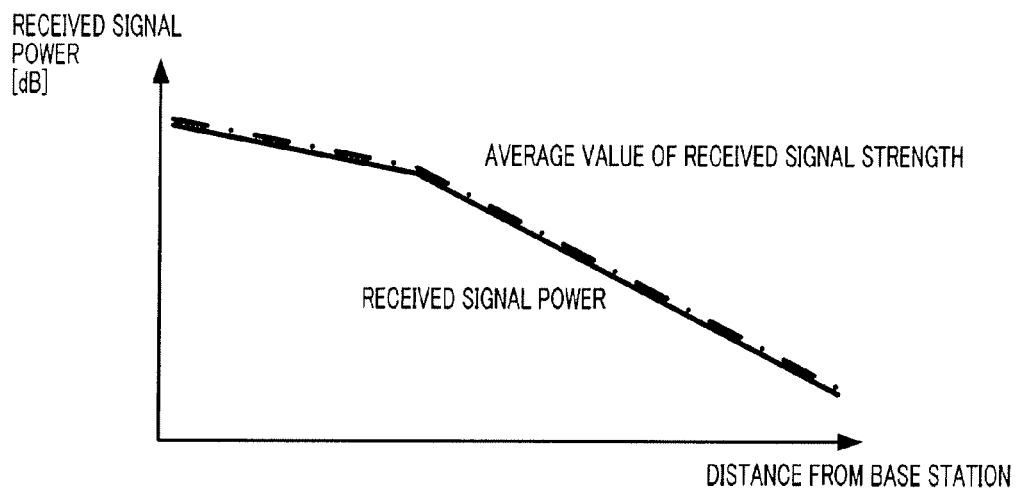
FIG. 6A illustrates the relationships between the distance from the base station, the received signal strength and the received signal power.
Figure 6B:
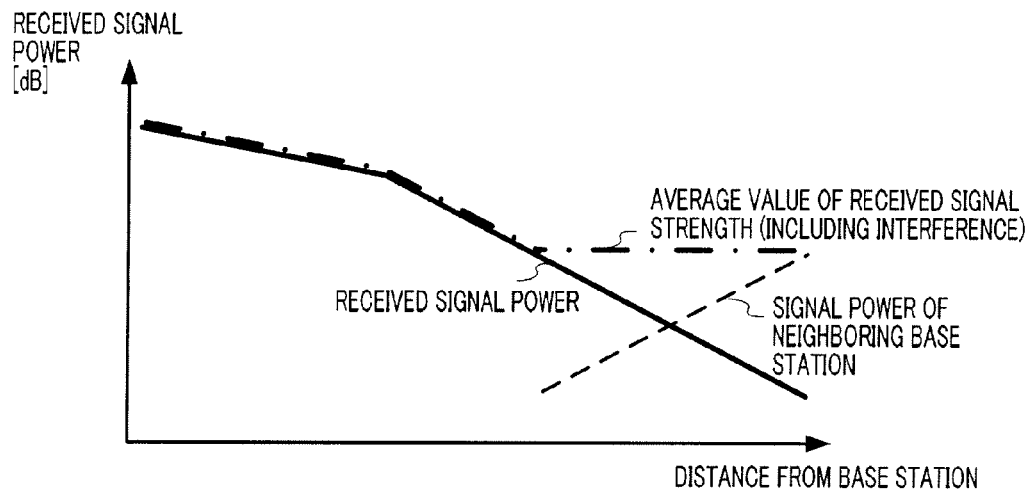
FIG. 6B illustrates the relationships between the distance from the base station, the received signal strength and the received signal power.

The reason received signal power is used to estimate the distance between a base station and a communication terminal in above-described RACH format selecting section 206, will be explained. FIGS. 6A and 6B show the relationships between the distance from the base station, the received signal strength and the received signal power. FIG. 6A shows a isolated cell environment, and FIG. 6B shows a multi-cell environment. In FIGS. 6A and 6B, the solid lines shows received signal power, the dashed-dotted lines shows an average value of the received signal strength, and the dotted lines shows the signal power in the neighboring base stations.

First, in a mobile communication systems, even when the distance from the base station is fixed, instantaneous received signal strength shows significant fluctuations due to shadowing and instantaneous variation, for example. Accordingly, measured values of the received signal strength are averaged over a certain period of time such that received signal strength shows fluctuation characteristics matching the distance from the base station. On the other hand, if a signal of a broader bandwidth than the frequency correlation bandwidth of the channel is transmitted in downlink, fluctuation characteristics are obtained matching the distance by averaging in the frequency domain. Moreover, combining averages of time and frequencies improves estimation accuracy.

In a isolated cell system, received signal is hardly influenced on interference signals from the neighborhoods, and so, the received signal strength measured in a communication terminal is almost as same as the received signal power of the downlink signal transmitted from a target base station as shown in FIG. 6A. Consequently, SIR estimation and received signal power estimation are not necessary. In this case, based on the received signal strength measured in received signal strength measuring section 203, RACH format selecting section 206 selects a RACH format.

On the other hand, in a multi-cell system, the similar signals are transmitted from the neighboring base stations, and, the number of signals transmitted from the neighboring cells (interference signals) increase when a communication terminal is closer to a cell boundary. As shown in FIG. 6B, the measured received signal strength reflects not only the signal from the target base station but also interference signal power from the neighboring cells (or nearby cells). Accordingly, in a multi-cell system, not only the received signal strength is measured, but also SIR is estimated using pilot signals and data signals in downlink. Consequently, received signal power estimating section 205 needs to calculate received signal power subtracting interference signal power from the received signal strength measurement value, using the ratio between signal power and interference power acquired by the received signal strength measurement value and SIR estimation.

Figure 7:
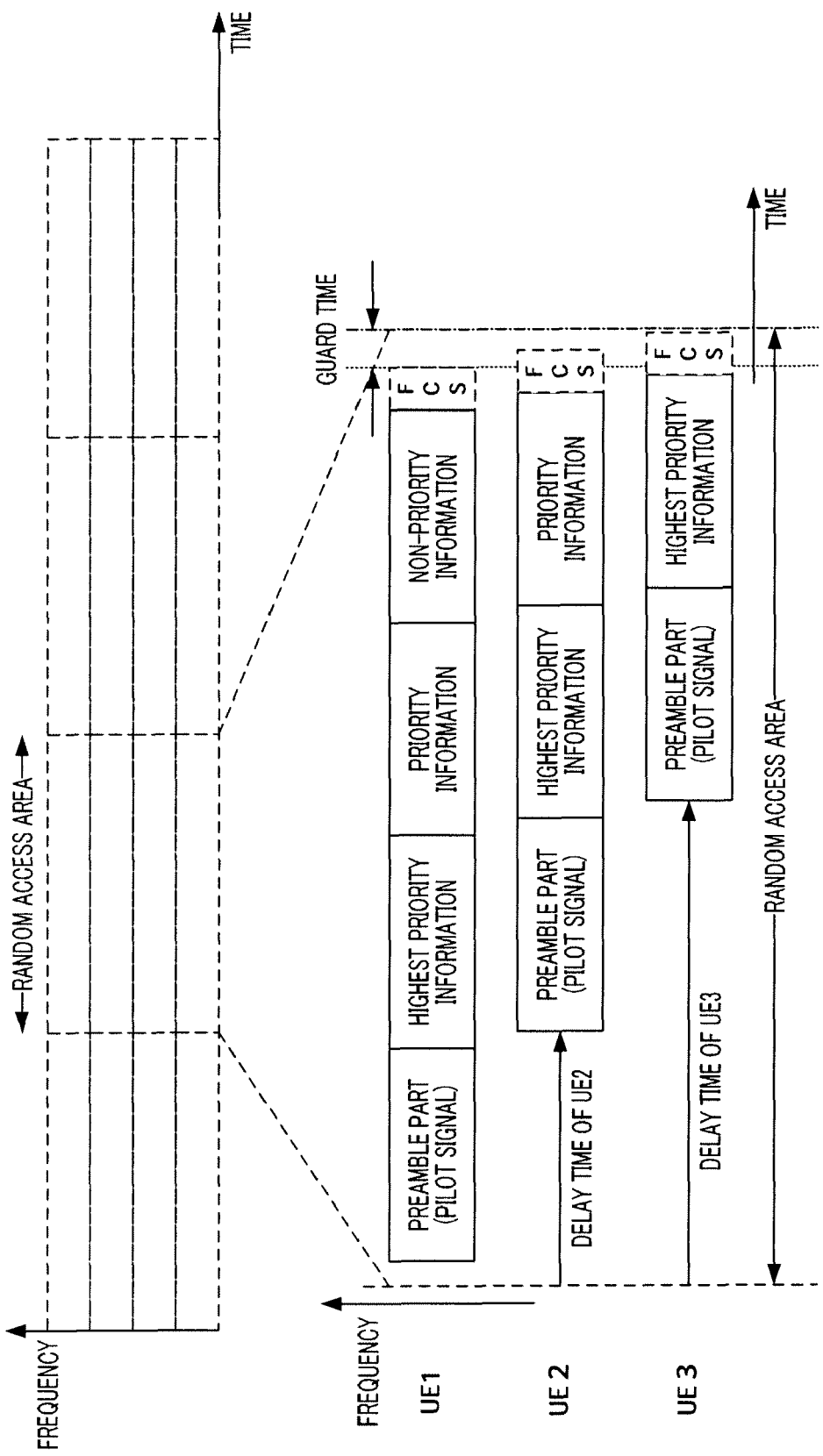
FIG. 7 illustrates RACH arrival timings.

FIG. 7 shows RACH arrival timings. This figure shows a case where, UE1 is located closest to the base station and uses the first RACH format, UE2 is located in the middle between the base station and a cell boundary and uses the second RACH format, and UE3 is located near a cell boundary and uses the third RACH format. As shown in this figure, delay time becomes longer when a communication terminal is farther from the base station, but, the RACH format of short frame length is used by the length of delay time, so that the guard time period provided in the random access area can be reduced.

In this way, according to Embodiment 1, a plurality of RACH formats of different frame lengths are prepared, and the RACH formats of shorter frame lengths are used by a communication terminal when the communication terminal is farther from the base station, so that it is possible to reduce the guard time in the random access area and to secure the uplink data transmission area.

Embodiment 2

Figure 8:
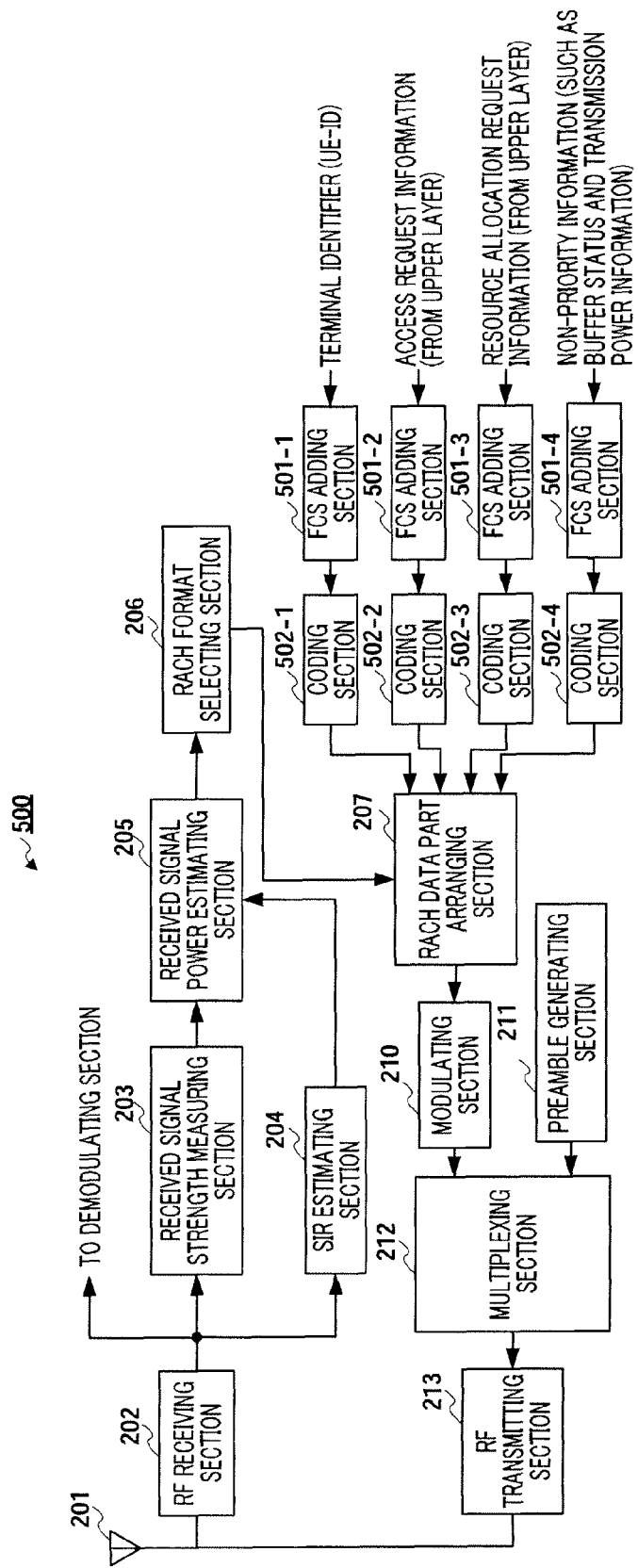
FIG. 8 is a block diagram showing the configuration of the communication terminal according to Embodiment 2 of the present invention.

FIG. 8 is a block diagram showing the configuration of communication terminal 500 according to Embodiment 2 of the present invention. FIG. 8 is different from FIG. 4 in that FCS adding section 208 and coding section 209 are changed to FCS coding sections 501-1 to 501-4 and coding sections 502-1 to 502-4.

FCS adding section 501-1 adds an FCS to the information bits of the terminal identifier, and, coding section 502-1 performs error correction coding processing of the terminal identifier with a FCS, and outputs an encoded bit sequence of the terminal identifier to RACH data part arranging section 207.

FCS adding sections 501-2 to 501-4 and coding sections 502-2 to 502-4, similar to FCS adding section 501-1 and coding section 502-1, respectively process the access request information, resource allocation request information and non-priority information.

Based on the RACH format reported from RACH format selecting section 206, RACH data part arranging section 207 adequately selects coded bit sequences of the terminal identifier, access request information, resource allocation request information and non-priority information outputted from coding sections 502-1 to 502-4 and arranges a data part in the RACH. The arranged RACH data part is outputted to modulating section 210.

Coding sections 502-1 to 502-4 can apply a FEC in accordance with significance of inputted information or the number of bits.

Figure 9A:
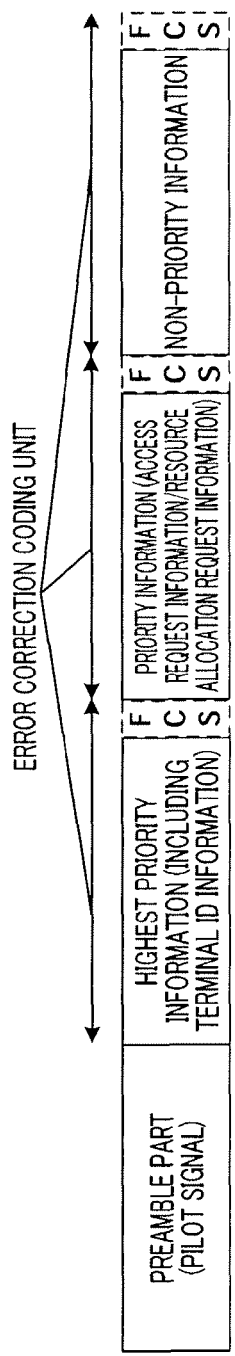
FIG. 9A illustrates the RACH format according to Embodiment 2 of the present invention.
Figure 9B:
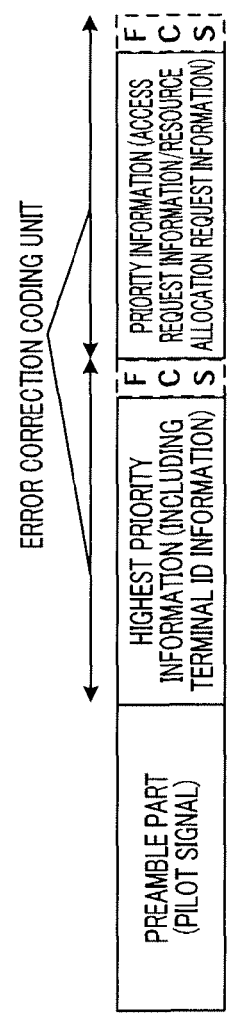
FIG. 9B illustrates the RACH format according to Embodiment 2 of the present invention.
Figure 9C:
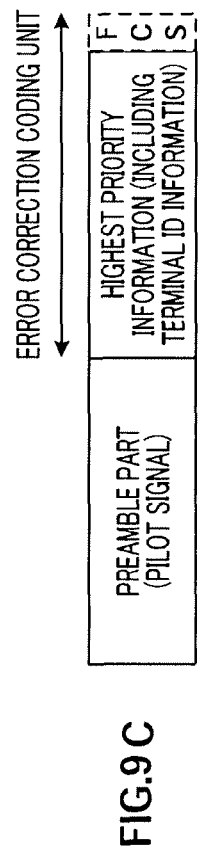
FIG. 9C illustrates the RACH format according to Embodiment 2 of the present invention.

FIGS. 9A to 9C show RACH formats generated as such. FIG. 9A shows the first RACH format, FIG. 9B shows the second RACH format and FIG. 9C shows the third RACH format. As shown in these figures, the information classified into according to priority constitutes the error correction coding unit, and each coding unit includes an FCS. Each coding unit may not include an FCS.

In this way, according to Embodiment 2, the base station cannot specify which RACH format is used by a communication terminal until the base station receives the RACH, and so the communication terminal performs error correction coding processing for every item of information classified according to priority, and the base station performs demodulating processing for every item of information in accordance with priorities, so that, the base station can demodulate RACH's without specifying the RACH formats. Moreover, a modulation scheme and a FEC (Forward Error Correction) can be configured every item of information matching a priority level, so that flexibility, which includes increasing robustness for more significant information, for example, can be improved.

Figure 10A:
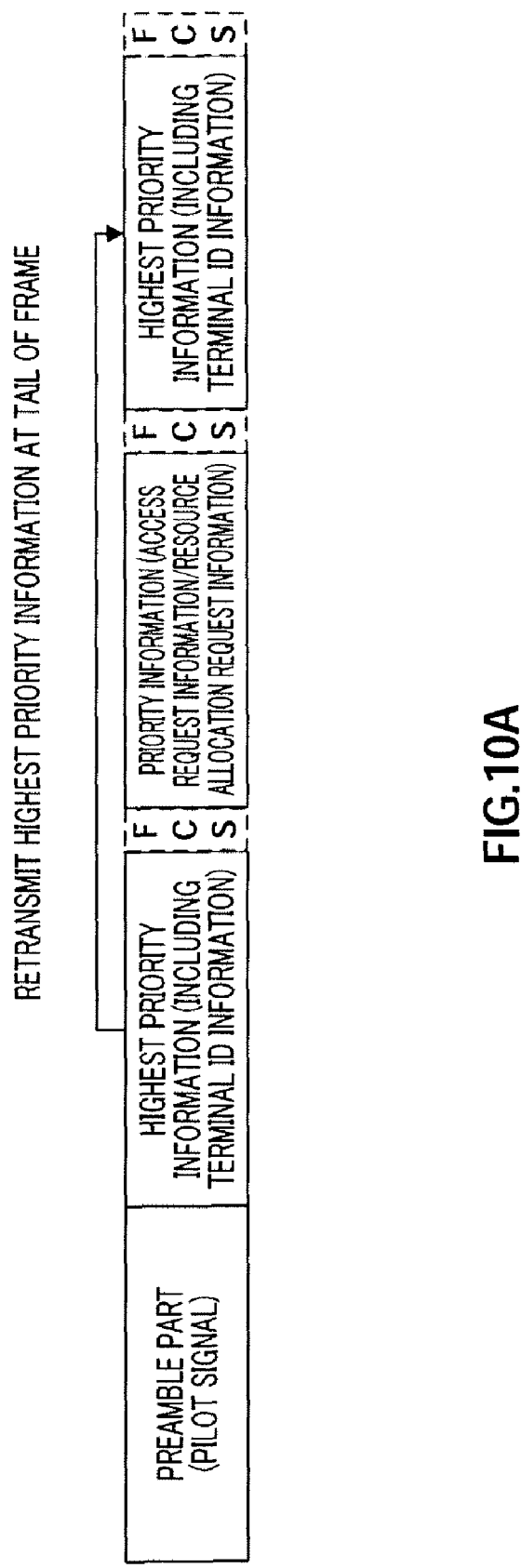
FIG. 10A illustrates an applied example of the first RACH format.

Although a case has been explained above with the present embodiment where non-priority information is arranged in the final FEC block in the first RACH format as shown in FIG. 9A, the highest priority information may be arranged again in this FEC block as shown in FIG. 10A.

Figure 10B:
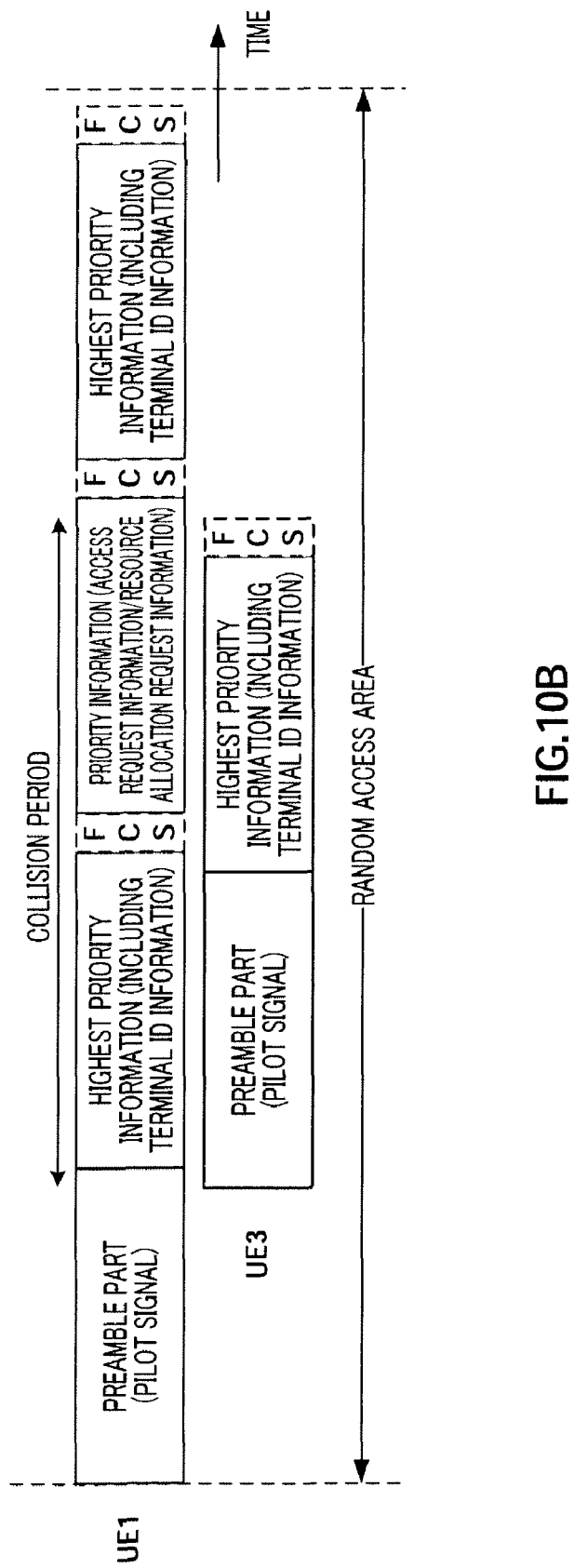
FIG. 10B illustrates an applied example of the first RACH format.

By this means, as shown in FIG. 10B, even when a RACH frame of the longest frame length (the first RACH format) and a RACH frame of shorter length collide in an area, the highest priority information is repeated and arranged between distant blocks, so that at least one item of the highest priority information can be demodulated and the arrival timing of this RACH and the terminal identifier can be specified. Consequently, access request information and resource allocation request information can be allocated in the scheduled channel and transmitted.

Embodiment 3

Figure 11:
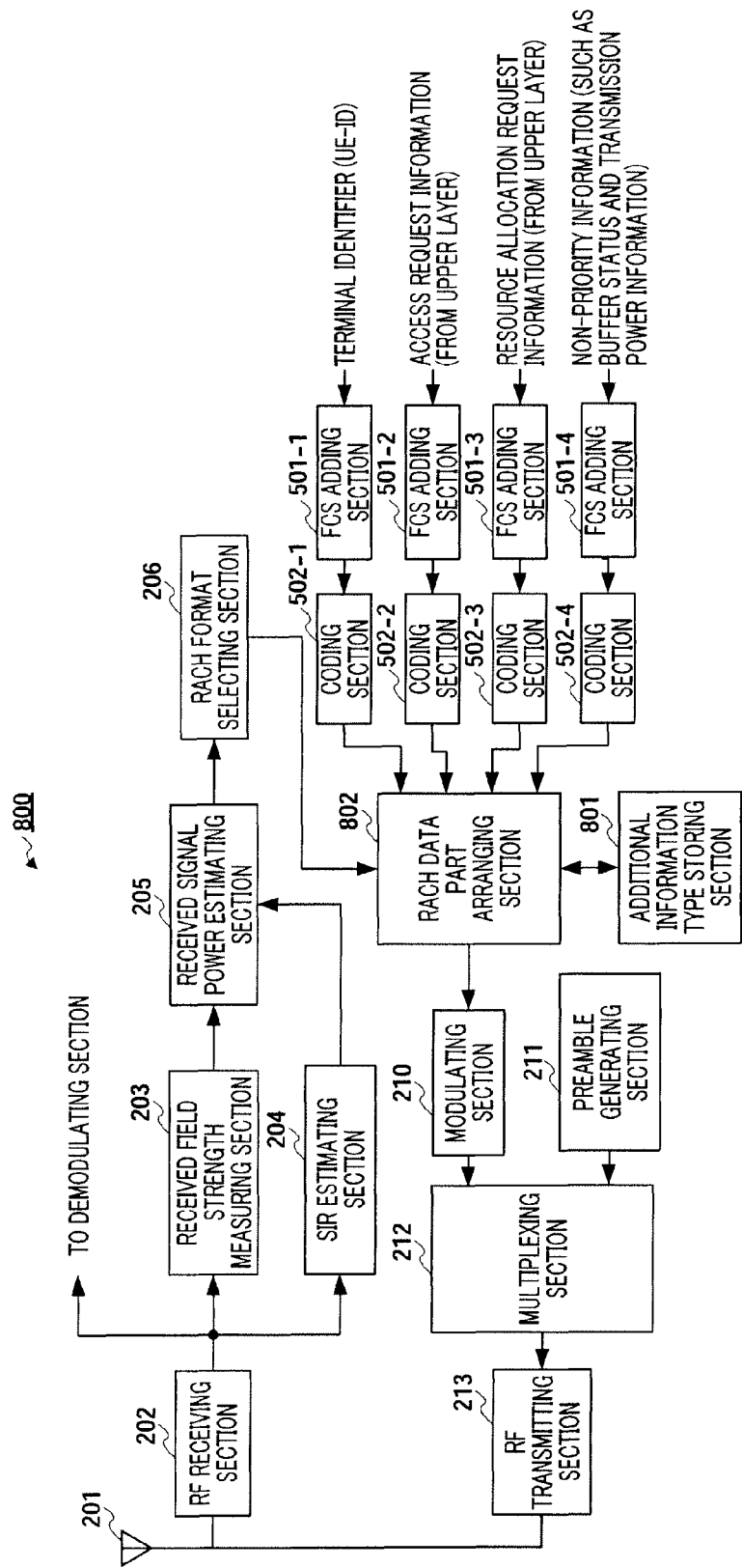
FIG. 11 is a block diagram showing the configuration of the communication terminal according to Embodiment 3 of the present invention.

FIG. 11 is a block diagram showing the configuration of communication terminal 800 according to Embodiment 3 of the present invention. FIG. 11 is different from FIG. 8 in that additional information type storing section 801 is added, and RACH data part arranging section 207 is changed to RACH data part arranging section 802.

Additional information type storing section 801 stores the types of information arranged next to the highest priority information in the RACH formats and indicators showing these types (additional information indicators). Their corresponding relationships are shown in FIG. 12, for example, and, when the additional information type is "no additional information (in the third RACH format)," the additional information indicator is "000." Moreover, similarly, the access request information is "001," the resource allocation request information is "010," the access request information and non-priority information is "011," the resource allocation request information and non-priority information is "100," and the user data (of the same frame length as the first RACH format) is "101." These corresponding relationships are also kept in the base station.

Based on the RACH format reported from RACH format selecting section 206, RACH data part arranging section 802 adequately selects the terminal identifier, access request information, resource allocation request information and non-priority information, and arranges the data part in the RACH. Moreover, RACH data part arranging section 802 acquires the additional information indicator showing the type of the information to be arranged next to the highest priority information, from additional information type storing section 801, and arranges the acquired additional information indicator included in the highest priority information.

Figure 13A:
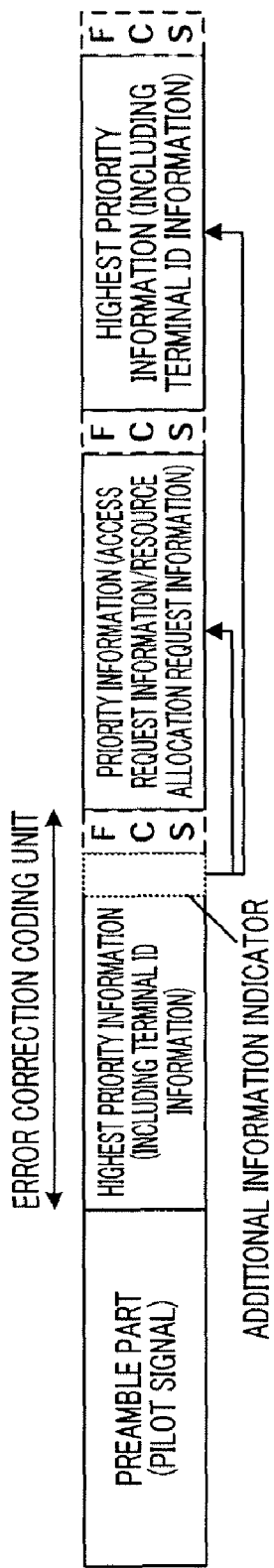
FIG. 13A illustrates the RACH format according to Embodiment 3 of the present invention.
Figure 13B:
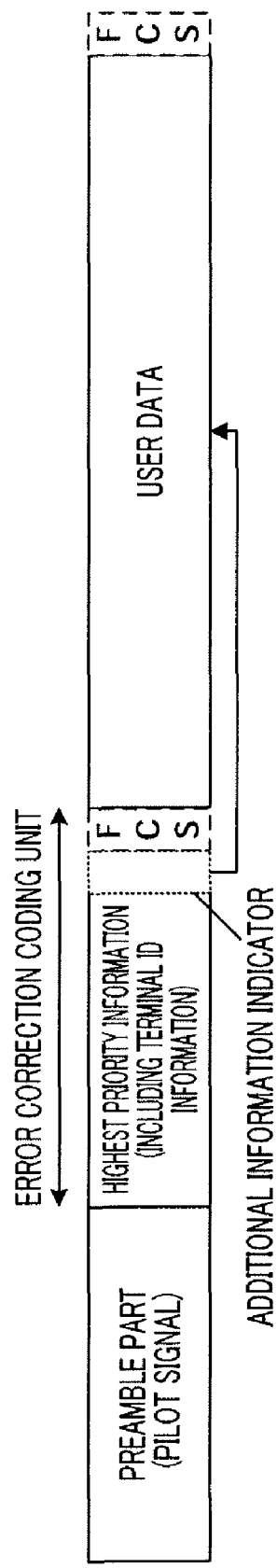
FIG. 13B illustrates the RACH format according to Embodiment 3 of the present invention.
Figure 13C:
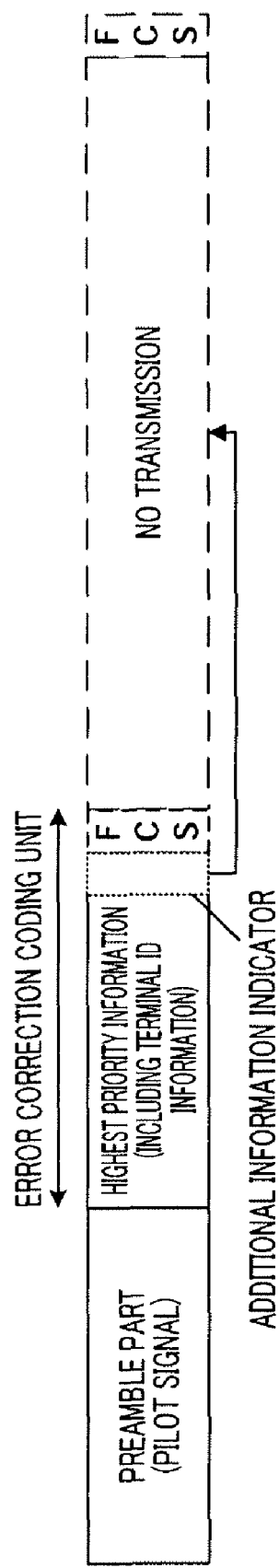
FIG. 13C illustrates the RACH format according to Embodiment 3 of the present invention.

FIGS. 13A to 13C show the RACH formats generated as such. FIG. 13A shows the first RACH format, FIG. 13B shows a case where user data is arranged in the priority information and the non-priority information in the first RACH format, and FIG. 13C shows the third RACH format. Here, as shown in FIG. 13B, a small size of user data may be transmitted using RACH, and this makes it possible to reduce the amount of signaling and time of communication setup upon transmission of the small size of user data.

In this way, according to Embodiment 3, indictors showing the types of information arranged next to the highest priority information are included in the highest priority information, so that, at the base station, it is possible to identify whether or not there is additional information and identify the types of additional information when there is additional information, only by demodulating the highest priority information, and consequently, it is not necessary to estimate RACH formats, thereby reducing receiving errors of RACH.

Embodiment 4

With Embodiment 4 of the present invention, a RACH transmission method will be explained supporting a system where the transmitting side transmits RACH with a CP (Cyclic Prefix), and the receiving side performs frequency domain equalization for channel fluctuation received in a propagation path using time-to-frequency domain conversion processing represented by Fourier transform.

Figure 14:
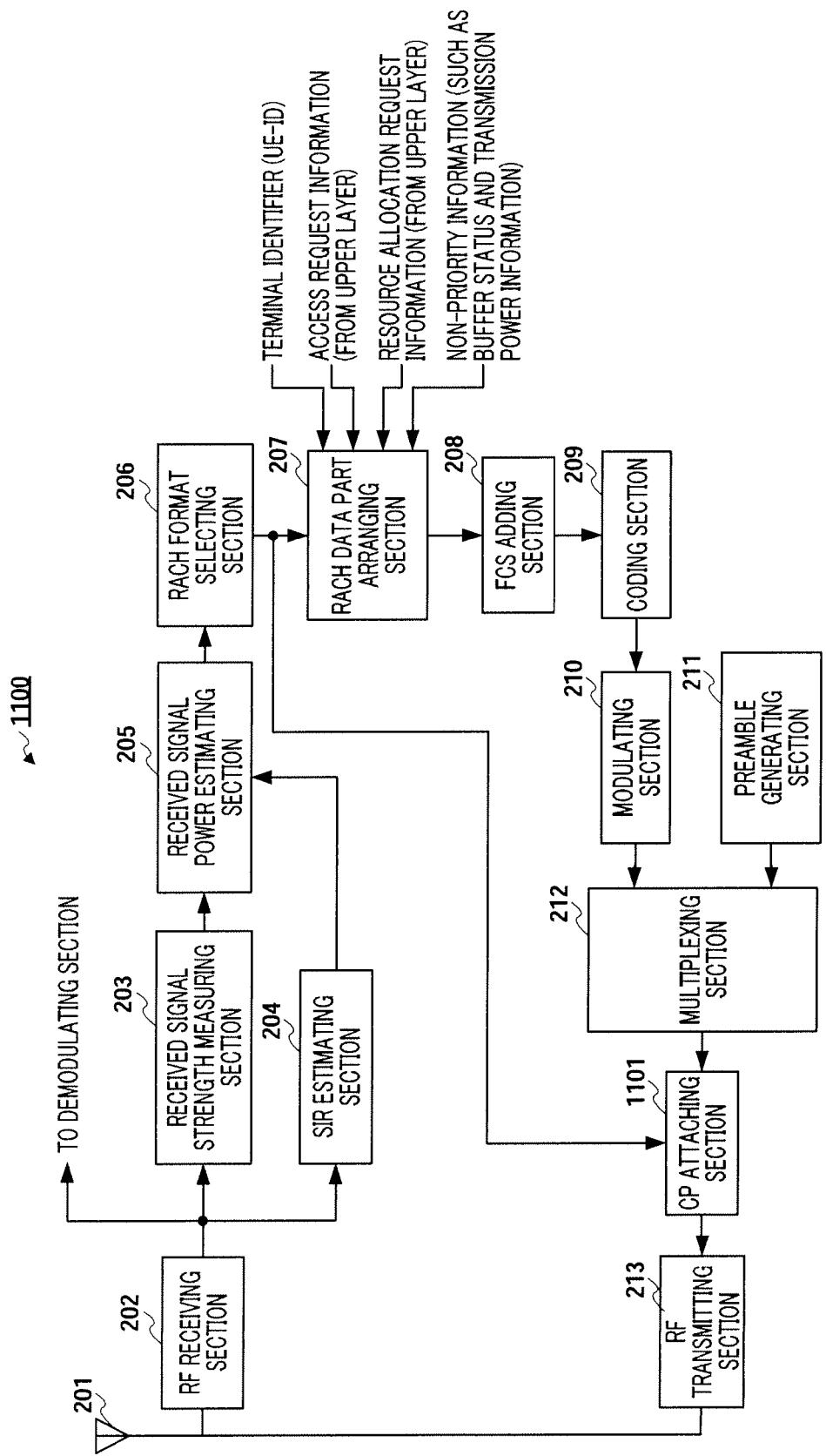
FIG. 14 is a block diagram showing the configuration of the communication terminal according to Embodiment 4 of the present invention.
Figure 15:
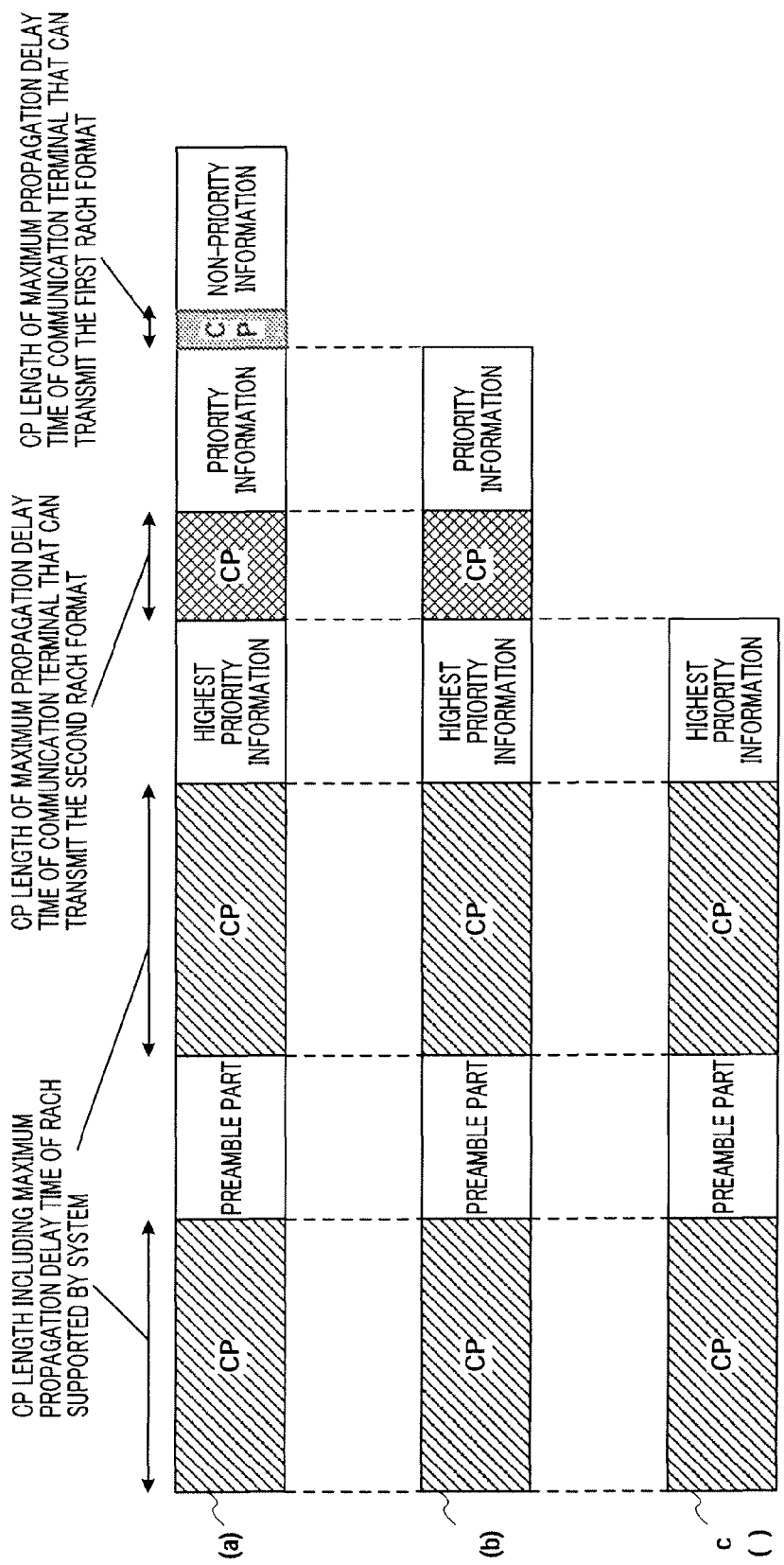
FIG. 15 illustrates the RACH format according to Embodiment 4 of the present invention.

FIG. 14 is a block diagram showing the configuration of communication terminal 1100 according to Embodiment 4 of the present invention. FIG. 14 is different in FIG. 4 in that CP attaching section 1101 is added. In FIG. 14, based on the RACH format outputted from RACH format selecting section 206, CP attaching section 1101 attaches a CP to every item of information classified according to priority outputted from multiplexing section 212. To be more specific, as shown in FIG. 15, CP attaching section 1101 sets the length of the CP to be attached to the highest priority information including the preamble part and the terminal identifier that each communicating terminal transmits, to a length including the maximum propagation delay for the RACH supported by the system. Moreover, CP attaching section 1101 sets the length of the CP to be attached to the priority information such as access request information/resource allocation request information transmitted in the first RACH format and the second RACH format, to a length of the CP of the maximum propagation delay time of the communication terminal that can transmit the second RACH format. Moreover, CP attaching section 1101 sets the CP length attached to the information part transmitted in the first RACH format only to a length of the CP of the maximum propagation delay time of the communication terminal that can transmit the first RACH format. The signals where CP is attached are transmitted to RF transmitting section 213.

Figure 16:
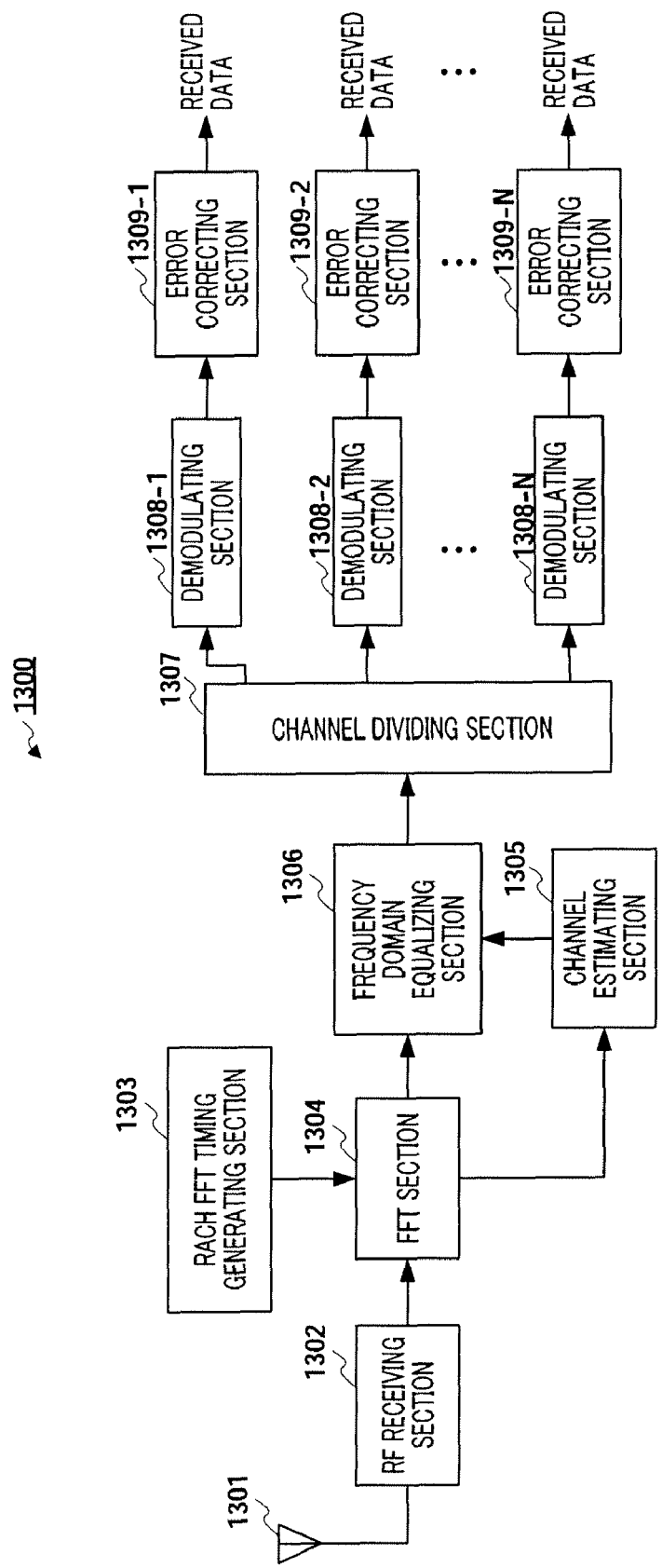
FIG. 16 is a block diagram showing the configuration of the base station according to Embodiment 4 of the present invention.

FIG. 16 is a block diagram showing the configuration of base station 1300 according to Embodiment 4 of the present invention. Referring to this figure, RF receiving section 1302 receives uplink signals (here, RACH in particular) transmitted from the communication terminals from antenna 1301, performs radio receiving processing such as down conversion and A/D conversion on the received uplink signals and outputs the signals subjected to radio receiving processing to FFT section 1304.

RACH FFT timing generating section 1303 generates an FFT timing signal according to the preamble part, data part and CP forming with the RACH and outputs the generated FFT timing signal to FFT section 1304.

According to the FFT timing outputted from RACH FFT timing generating section 1303, FFT section 1304 performs FFT (Fast Fourier Transform) processing on the signals outputted from RF receiving section 1302, converts the time domain signals to frequency domain signals and outputs the frequency domain signals to channel estimating section 1305 and frequency domain equalizing section 1306.

Channel estimating section 1305 estimates the frequency response of the channel received by the received signal on the propagation path using the preamble part, out of the signals outputted from FFT section 1304, and outputs a channel estimation value to frequency domain equalizing section 1306.

Frequency domain equalizing section 1306 collectively performs frequency domain equalization processing over the items of information of the RACH frame of the entire band outputted from FFT section 1304 using the channel estimation value outputted from channel estimating section 1305 and outputs the signal subjected to frequency domain equalization processing to channel dividing section 1307.

Channel dividing section 1307 divides the signals outputted from frequency domain equalizing section 1306 into RACH's for every communication terminal, outputs the divided RACH's to corresponding demodulating sections 1308-1 to 1308-N, respectively.

Demodulating sections 1308-1 to 1308-N demodulate the RACH's for every communication terminal outputted from channel dividing section 1307, and error correcting sections 1309-1 to 1309-N perform error correction coding processing of the demodulated RACH's and acquire data transmitted with RACH.

Figure 17:
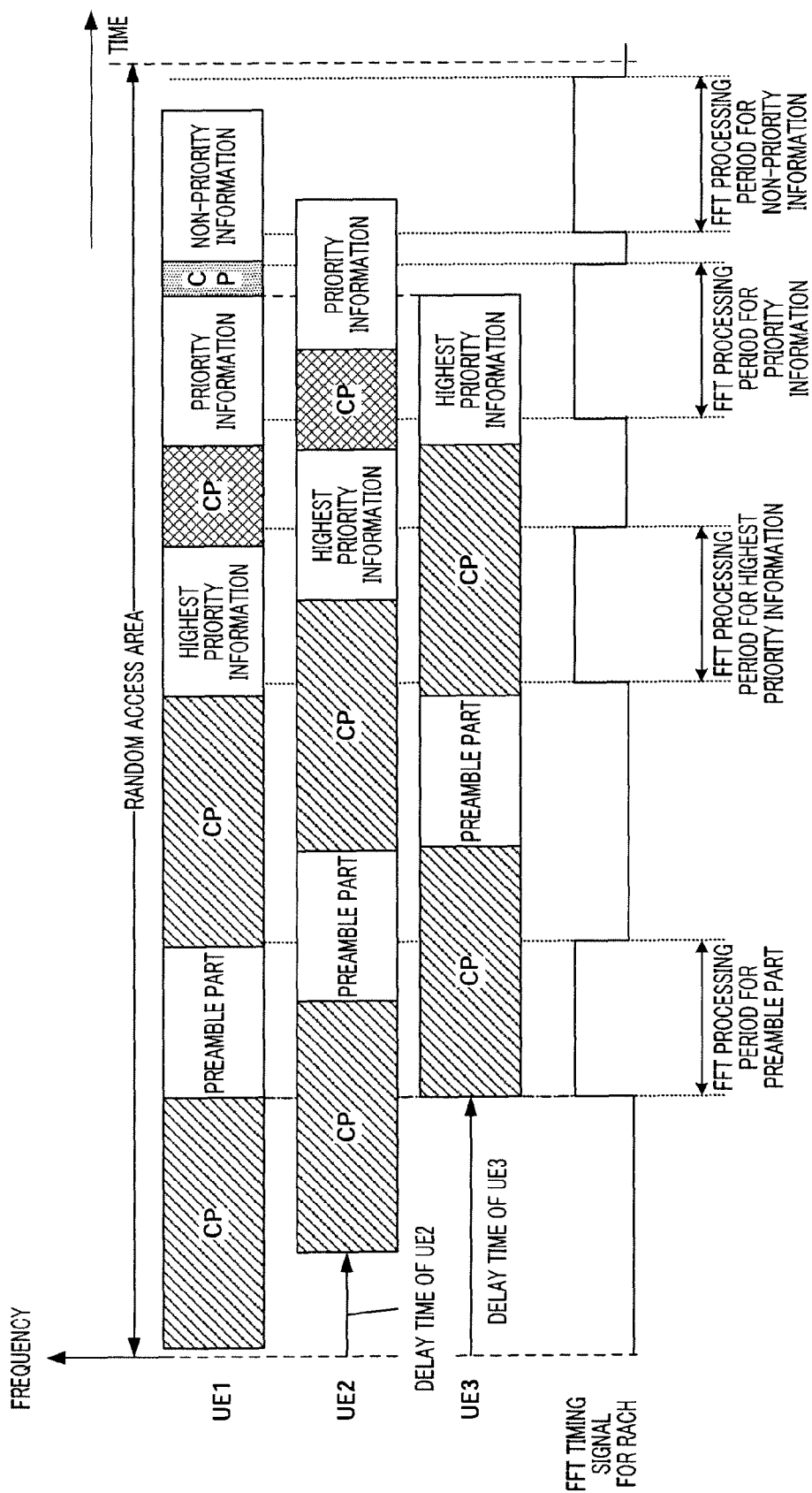
FIG. 17 illustrates timings showing the relationships between the RACH frames for a communication terminal and the FFT timings for the RACH.

Next, the FFT timing signal generated by RACH FFT timing generating section 1303 shown in FIG. 16 will be explained. FIG. 17 shows timings showing relationships between the RACH frames per communication terminal received by the base station and the FFT timings for the RACH.

The CP's including the maximum propagation delay time are added to the preamble parts and the highest priority information, so that, by performing FFT on these items of information in the FFT processing period for preamble part and FFT processing period for highest priority information shown in FIG. 17, the preamble parts and highest priority information for all RACH's can be collectively converted.

Moreover, by performing an FFT on the priority information transmitted in the first RACH format and the second RACH format in the FFT processing period for the priority information shown in FIG. 17, the priority information can be collectively converted.

Furthermore, by performing an FFT on the non-priority information transmitted in the first RACH format only in the FFT processing period for the non-priority processing period shown in FIG. 17, the non-priority information can be extracted.

In this way, according to Embodiment 4, by setting CP lengths matching the maximum propagation delay time from information of the highest priority level in descending order, and, by adding these CP's to information classified according to the levels of priority, the base station is able to perform time-frequency conversion represented by FFT on RACH's transmitted in the random access areas at common window timings, and does not have to perform time-frequency conversion individually on the received RACH's per communication terminal, so that the base station can collectively process time-frequency conversion, channel estimation and frequency domain equalization, thereby simplifying a configuration of the base station.

Embodiments of the present invention have been explained.

Although cases have been described above with the embodiments with three RACH formats of different frame lengths as an example, the present invention is not limited to this, and, two, three or more RACH formats of different frame length may be used.

Moreover, although cases have been explained above with the embodiments where the random access area and other access areas are time division multiplexed (TDM), with the embodiments above, the present invention is not limited to this, and, frequency division multiplexing (FDM), code division multiplexing (CDM) and space division multiplexing (SDM) may be used as well.

Moreover, although cases have been explained above with the embodiments where RACH transmission area employs frequency division multiple access (FDMA), the present invention is not limited to this, and, code division multiple access (CDMA), time division multiple access (TDMA), and space division multiple access (SDMA) may be used as well.

Moreover, although with the embodiments above cases have been described where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2005-379405, filed on Dec. 28, 2005, including the specification, drawings and abstract is incorporated herein by reference in its entirety.

INDUSTRIAL APPLICABILITY

The radio transmitting apparatus and a radio transmission method according to the present invention can reduce guard time increase in random access areas and keep uplink data transmission areas, and are applicable, for example, to mobile communication terminal apparatuses in mobile communication systems.

The invention claimed is:

1. A radio transmitting apparatus, comprising:
a propagation distance estimating section that estimates a propagation distance from a communicating party station based on a signal transmitted from the communicating party station;
a selecting section that selects a random access channel format of a frame length supporting the estimated propagation distance, from a plurality of random access channel formats of frame lengths supporting propagation distances;
a transmitting section that transmits a random access channel frame using the selected random access channel format; and
an arrangement section that arranges a plurality of items of information in the selected random access channel format, according to the frame length of the selected random access channel format, in descending order of levels of priority assigned respectively to the plurality of items of information, wherein:
the arrangement section arranges only an item of information of a highest level of priority in a random access channel format of a shortest frame length from among the plurality of random access channel formats.

2. The radio transmitting apparatus according to claim 1, wherein the arrangement section arranges identification information that identifies the radio transmitting apparatus and known information as the item of information of the highest level of priority.

3. The radio transmitting apparatus according to claim 1, wherein the arrangement section arranges access request information and resource allocation request information as information of a second highest level of priority.

4. The radio transmitting apparatus according to claim 1, further comprising a coding section that individually performs coding for every item of information assigned a level of priority.

5. The radio transmitting apparatus according to claim 4, wherein the arrangement section arranges the item of information of the highest level of priority again in a final area in a random access channel format of a longest frame length from among the plurality of random access channel formats.

6. The radio transmitting apparatus according to claim 4, further comprising a storing section that stores a type of information to be arranged next to the information of the highest level of priority, in association with an indicator showing the type,
wherein the arrangement section includes in the information of the highest level of priority the indicator according to the type of the information to be arranged next to the information of the highest level of priority.

7. The radio transmitting apparatus according to claim 1, further comprising a cyclic prefix attaching section that sets a cyclic prefix length, for every item of information assigned a priority level and arranged in the selected random access channel format, matching a maximum propagation delay time based on the frame length, and attaches the cyclic prefix length of the set length to every one of the items of information.

8. A radio transmitting method comprising:
estimating a propagation distance from a communicating party station based on a signal transmitted from the communicating party station;
selecting a random access channel format of a frame length supporting the estimated propagation distance, from a plurality of random access channel formats of frame lengths supporting propagation distances;
transmitting a random access channel frame using the selected random access channel format; and
arranging a plurality of items of information in the selected random access channel format, according to the frame length of the selected random access channel format, in descending order of levels of priority assigned respectively to the plurality of items of information, wherein:
only an item of information of a highest level of priority is arranged in a random access channel format of a shortest frame length from among the plurality of random access channel formats.

* * * * *